No. 692,999. Patented Feb. 11, 1902.
M. FLICK.
WHEELED TOY.
(Application filed July 8, 1901.)
(No Model.)
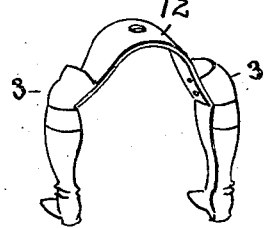
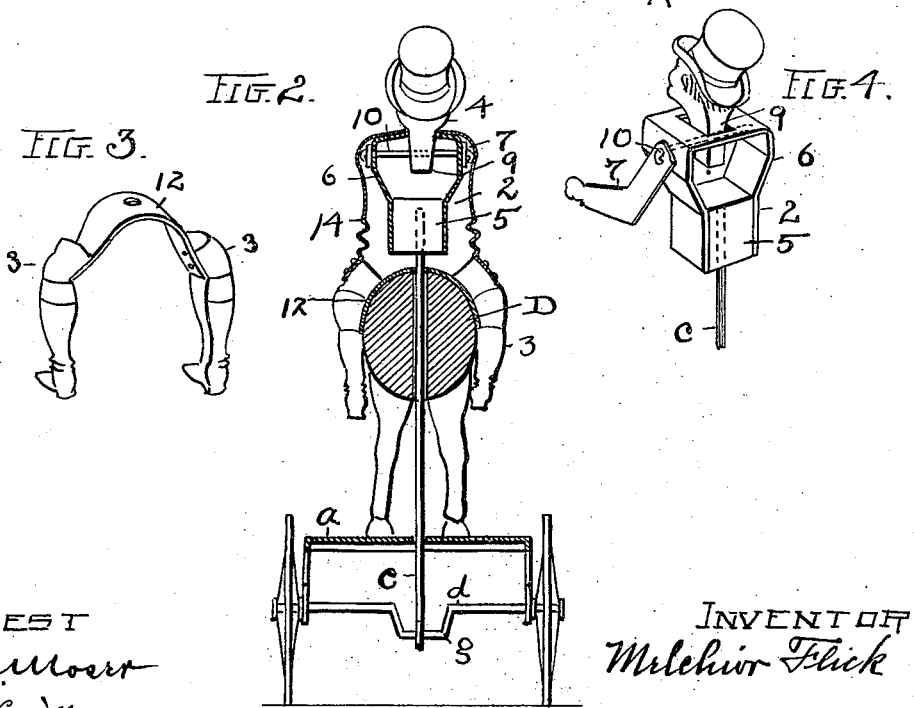
ATTEST
R. B. Moerr
H. E. Mudra.
INVENTOR
Melchior Flick
By H. T. Fisher ATTY

ID">---
UNITED STATES PATENT OFFICE.

MELCHIOR FLICK, OF CLEVELAND, OHIO.

WHEELED TOY.

SPECIFICATION forming part of Letters Patent No. 692,999, dated February 11, 1902.

Application filed July 8, 1901. Serial No. 67,390. (No model.)

*To all whom it may concern:*

Be it known that I, MELCHIOR FLICK, a citizen of the United States, residing at Cleveland, in the county of Cuyahoga and State of Ohio, have invented certain new and useful Improvements in Wheeled Toys; and I do declare that the following is a full, clear, and exact description of the invention, which will enable others skilled in the art to which it appertains to make and use the same.

My invention has reference to wheeled toys; and the object of the invention is to provide a wheeled toy with a horse and rider in which the rider is given certain movements in body and members corresponding more or less to the natural movements of a rider on horseback and which are produced through internal mechanism connected with or operated by the running-gear or wheels of the carriage, substantially as herein shown and described, and particularly pointed out in the claims.

Figure 1 is a side elevation of my toy horse and rider and of the carriage, partly in section. Fig. 2 is a vertical central cross-sectional elevation on a line corresponding to A A, Fig. 1. Fig. 3 is a perspective view of the legs and leg connection of the rider detached from the other parts, and Fig. 4 is a perspective view from the rear and side of the body part and head of the rider detached from the other parts.

$a$ represents the carriage or wheel support of the horse, which may be fashioned in any preferred way, with three or four wheels and having a platform or a body of plain or fanciful design, as may seem best, and provided front or rear with a crank-shaft or its equivalent for operating the rod $c$. In this instance, and preferably, a shaft $d$ at the rear of the vehicle is used, and presumably there are four wheels on the vehicle, as here shown.

D is the horse, fixed firmly upon the carriage and equipped with a bridle for the rider. The rider as such is subdivided into three distinct parts—the body 2, legs 3, and head 4—and the operating-rod $c$ is inserted in or rigidly secured to block 5 in the body. It will be noticed that the upper portion of said rod is straight, while its lower portion curves rearward and makes connection with crank $g$ on axle $d$. I might substitute mechanism consisting of two or more parts in lieu of this rod to get the same mechanical effect; but the rod is simple and direct in operation and much less liable to get out of operating condition than other mechanism would be. The body of the rider comprises block 5 and the substantially U-shaped body portion on which are supported the arms 7, rigidly or pivotally, as may be preferred, and with at least one hand engaging the fixed reins 8, while the other arm may be free. The head 4 has a neck 9 extending down loosely into body portion 6 and supported in this instance on a cross-rod 10, so that it has a pivotal back-and-forth movement within limits adapting it to rock with the movements of the body, as usual in riding, and the body of the rider is supported above the body of the horse, so as to give room for up-and-down action as the crank may require and for the back-and-forth oscillation which the operations of the rod will produce. The two legs 3 of the rider are united by a strap 12, preferably of leather, which lies across the body of the horse and has rod $c$ passing through it, so that this strap will be somewhat moved back and forth on the body of the horse during the operations of rod $c$, and this will impart more or less swinging movement to legs 3. Then over all I put a coat or jacket 14, which is cut to fit the entire figure of the rider, having a collar that comes up about the neck, sleeves for the arms and adapted to come down over the upper portion of the legs and conceal the mechanism beneath, the said garment being secured to the several parts here and there, as may be found best. It is also designed that the said garment, coat, or cover shall have some extra length midway, especially so as to accommodate it to the up-and-down movement of the body, as shown. This conceals all the operating features in so far as the rider is concerned, forms a connection between the body and the legs or limbs 3 of the rider, and modifies the movements of the parts to the eye, thus avoiding abruptness and contributing to naturalness of motion. The body of the horse is provided with a tapered slot 15 to accommodate operating-rod $c$; but this is not visible from the outside, and the play of rod $c$ is not especially noticeable when the carriage is in operation and the eye is attracted to the movements of the rider.

Of course any suitable figure of a rider, whether it be a man or child, may be used, and, likewise, any figure of a horse or other animal may be used, so that where a horse is referred to herein it is meant to include also other animals which might take his place.

It will be noticed that both up-and-down and back-and-forth movements are given to the rider, the body being tilted by rod c; but the jacket or coat serves to keep the body in place and to more or less modify its actions.

What I claim is—

1. In a toy, a suitable carriage and a horse fixed thereon, a rider-body and an operating-support for said body connected with the running mechanism of the carriage to move said body up and down, and legs for the rider independent of his body and supported on the horse, substantially as described.

2. A toy comprising a suitable carriage and horse, a rider's body, means connected with the running-gear of the carriage to support and operate said body, legs for the rider connected across the horse and separate from the rider's body, and a flexible cover over said body and top of the legs, substantially as described.

3. A carriage, a horse, and a rider arranged substantially as shown, an operating-rod connected with the body of said rider and crank mechanism on the carriage for operating said rod, a set of legs connected across the horse independently of the body of the rider, a head pivotally supported on said body and a coat covering the body of the rider and the top of his legs and fastened about its lower edge, substantially as described.

4. In toys, a horse and a rider thereon formed in three separate sections comprising the body, the legs and the head, the head being pivoted on the body and the legs connected across the horse independently of the body, a power-actuated rod for raising and lowering the body of the rider and a coat covering said body and legs, substantially as described.

5. In toy horses, a rider having a body-frame and the arms and head pivoted thereon, a pair of legs independent of the body and a connection between their upper ends across the horse, and a coat covering said body and arms and having the legs fixed thereto, said coat having slack length above its attachment to said legs, in combination with the horse and the carriage and a crank-operated rod fixed to the body of the rider and adapted to actuate said body independently of the legs of the rider, substantially as described.

Witness my hand to the foregoing specification this 25th day of May, 1901.

MELCHIOR FLICK.

Witnesses:
R. B. MOSER,
H. E. MUDRA.